United States Patent
Ciuc et al.

(10) Patent No.: US 8,345,114 B2
(45) Date of Patent: Jan. 1, 2013

(54) AUTOMATIC FACE AND SKIN BEAUTIFICATION USING FACE DETECTION

(75) Inventors: Mihai Ciuc, Bucuresti (RO); Adrian Capata, Bucuresti (RO); Valentin Mocanu, Bucuresti (RO); Alexei Pososin, Galway (IE); Corneliu Florea, Bucuresti (RO); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 517 days.

(21) Appl. No.: 12/512,796

(22) Filed: Jul. 30, 2009

(65) Prior Publication Data

US 2010/0026831 A1 Feb. 4, 2010

Related U.S. Application Data

(66) Substitute for application No. 61/084,942, filed on Jul. 30, 2008.

(51) Int. Cl.
*H04N 5/228* (2006.01)

(52) U.S. Cl. ............ 348/222.1; 382/118; 382/231; 382/254

(58) Field of Classification Search .......... 348/222.1; 382/118, 531, 254–275
See application file for complete search history.

(56) References Cited

U.S. PATENT DOCUMENTS

| | | | |
|---|---|---|---|
| 4,047,187 A | 9/1977 | Mashimo et al. | |
| 4,317,991 A | 3/1982 | Stauffer | |
| 4,367,027 A | 1/1983 | Stauffer | |
| RE31,370 E | 9/1983 | Mashimo et al. | |
| 4,448,510 A | 5/1984 | Murakoshi | |
| 4,456,354 A | 6/1984 | Mizokami | |
| 4,638,364 A | 1/1987 | Hiramatsu | |
| 4,690,536 A | 9/1987 | Nakai et al. | |
| 4,796,043 A | 1/1989 | Izumi et al. | |
| 4,970,663 A | 11/1990 | Bedell et al. | |
| 4,970,683 A | 11/1990 | Harshaw et al. | |
| 4,975,969 A | 12/1990 | Tal | |
| 5,008,946 A | 4/1991 | Ando | |
| 5,018,017 A | 5/1991 | Sasaki et al. | |
| RE33,682 E | 9/1991 | Hiramatsu | |
| 5,051,770 A | 9/1991 | Cornuejols | |
| 5,063,603 A | 11/1991 | Burt | |
| 5,111,231 A | 5/1992 | Tokunaga | |
| 5,150,432 A | 9/1992 | Ueno et al. | |
| 5,161,204 A | 11/1992 | Hutcheson et al. | |

(Continued)

FOREIGN PATENT DOCUMENTS

EP 578508 A2 1/1994

(Continued)

OTHER PUBLICATIONS

PCT Written Opinion of the International Search Authority, for PCT Application No. PCT/EP2009/005461, report dated Jan. 30, 2011, 7 pages.

(Continued)

*Primary Examiner* — Yogesh Aggarwal

(74) *Attorney, Agent, or Firm* — Andrew V. Smith

(57) ABSTRACT

Sub-regions within a face image are identified to be enhanced by applying a localized smoothing kernel to luminance data corresponding to the sub-regions of the face image. An enhanced face image is generated including an enhanced version of the face that includes certain original pixels in combination with pixels corresponding to the one or more enhanced sub-regions of the face.

21 Claims, 2 Drawing Sheets after applying selective smoothing/blur

U.S. PATENT DOCUMENTS

| | | | |
|---|---|---|---|
| 5,164,831 A | 11/1992 | Kuchta et al. |
| 5,164,992 A | 11/1992 | Turk et al. |
| 5,227,837 A | 7/1993 | Terashita |
| 5,278,923 A | 1/1994 | Nazarathy et al. |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,543,952 A | 8/1996 | Yonenaga et al. |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,748,764 A | 5/1998 | Benati et al. |
| 5,764,790 A | 6/1998 | Brunelli et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,802,220 A | 9/1998 | Black et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,912,980 A | 6/1999 | Hunke |
| 5,966,549 A | 10/1999 | Hara et al. |
| 5,978,519 A | 11/1999 | Bollman et al. |
| 5,990,973 A | 11/1999 | Sakamoto |
| 5,991,456 A | 11/1999 | Rahman et al. |
| 6,009,209 A | 12/1999 | Acker et al. |
| 6,016,354 A | 1/2000 | Lin et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,115,052 A | 9/2000 | Freeman et al. |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,188,777 B1 | 2/2001 | Darrell et al. |
| 6,192,149 B1 | 2/2001 | Eschbach et al. |
| 6,240,198 B1 | 5/2001 | Rehg et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,292,575 B1 | 9/2001 | Bortolussi et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,700,999 B1 | 3/2004 | Yang |
| 6,714,665 B1 | 3/2004 | Hanna et al. |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,798,834 B1 | 9/2004 | Murakami et al. |
| 6,801,250 B1 | 10/2004 | Miyashita |
| 6,801,642 B2 | 10/2004 | Gorday et al. |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,885,760 B2 | 4/2005 | Yamada et al. |
| 6,900,840 B1 | 5/2005 | Schinner et al. |
| 6,937,773 B1 | 8/2005 | Nozawa et al. |
| 6,940,545 B1 | 9/2005 | Ray et al. |
| 6,947,601 B2 | 9/2005 | Aoki et al. |
| 6,959,109 B2 | 10/2005 | Moustafa |
| 6,965,684 B2 | 11/2005 | Chen et al. |
| 6,967,680 B1 | 11/2005 | Kagle et al. |
| 6,977,687 B1 | 12/2005 | Suh |
| 6,980,691 B2 | 12/2005 | Nesterov et al. |
| 6,993,157 B1 | 1/2006 | Oue et al. |
| 7,003,135 B2 | 2/2006 | Hsieh et al. |

| Patent No. | Date | Name | | Pub. No. | Date | Name |
|---|---|---|---|---|---|---|
| 7,020,337 B2 | 3/2006 | Viola et al. | | 2002/0114535 A1 | 8/2002 | Luo |
| 7,027,619 B2 | 4/2006 | Pavlidis et al. | | 2002/0118287 A1 | 8/2002 | Grosvenor et al. |
| 7,027,621 B1 | 4/2006 | Prokoski | | 2002/0136433 A1 | 9/2002 | Lin |
| 7,034,848 B2 | 4/2006 | Sobol | | 2002/0141640 A1 | 10/2002 | Kraft |
| 7,035,456 B2 | 4/2006 | Lestideau | | 2002/0150662 A1 | 10/2002 | Dewis et al. |
| 7,035,462 B2 | 4/2006 | White et al. | | 2002/0168108 A1 | 11/2002 | Loui et al. |
| 7,035,467 B2 | 4/2006 | Nicponski | | 2002/0172419 A1 | 11/2002 | Lin et al. |
| 7,038,709 B1 | 5/2006 | Verghese | | 2002/0181801 A1 | 12/2002 | Needham et al. |
| 7,038,715 B1 | 5/2006 | Flinchbaugh | | 2002/0191861 A1 | 12/2002 | Cheatle |
| 7,039,222 B2 | 5/2006 | Simon et al. | | 2003/0012414 A1 | 1/2003 | Luo |
| 7,042,501 B1 | 5/2006 | Matama | | 2003/0023974 A1 | 1/2003 | Dagtas et al. |
| 7,042,505 B1 | 5/2006 | DeLuca | | 2003/0025812 A1 | 2/2003 | Slatter |
| 7,042,511 B2 | 5/2006 | Lin | | 2003/0035573 A1 | 2/2003 | Duta et al. |
| 7,043,056 B2 | 5/2006 | Edwards et al. | | 2003/0044070 A1 | 3/2003 | Fuersich et al. |
| 7,043,465 B2 | 5/2006 | Pirim | | 2003/0044177 A1 | 3/2003 | Oberhardt et al. |
| 7,050,607 B2 | 5/2006 | Li et al. | | 2003/0048950 A1 | 3/2003 | Savakis et al. |
| 7,057,653 B1 | 6/2006 | Kubo | | 2003/0052991 A1 | 3/2003 | Stavely et al. |
| 7,061,648 B2 | 6/2006 | Nakajima et al. | | 2003/0059107 A1 | 3/2003 | Sun et al. |
| 7,064,776 B2 | 6/2006 | Sumi et al. | | 2003/0059121 A1 | 3/2003 | Savakis et al. |
| 7,082,211 B2 * | 7/2006 | Simon et al. ........ 382/118 | | 2003/0071908 A1 | 4/2003 | Sannoh et al. |
| 7,082,212 B2 | 7/2006 | Liu et al. | | 2003/0084065 A1 | 5/2003 | Lin et al. |
| 7,099,510 B2 | 8/2006 | Jones et al. | | 2003/0095197 A1 | 5/2003 | Wheeler et al. |
| 7,106,374 B1 | 9/2006 | Bandera et al. | | 2003/0107649 A1 | 6/2003 | Flickner et al. |
| 7,106,887 B2 | 9/2006 | Kinjo | | 2003/0118216 A1 | 6/2003 | Goldberg |
| 7,110,569 B2 | 9/2006 | Brodsky et al. | | 2003/0123713 A1 | 7/2003 | Geng |
| 7,110,575 B2 | 9/2006 | Chen et al. | | 2003/0123751 A1 | 7/2003 | Krishnamurthy et al. |
| 7,113,641 B1 | 9/2006 | Eckes et al. | | 2003/0142209 A1 | 7/2003 | Yamazaki et al. |
| 7,119,838 B2 | 10/2006 | Zanzucchi et al. | | 2003/0151674 A1 | 8/2003 | Lin |
| 7,120,279 B2 | 10/2006 | Chen et al. | | 2003/0174773 A1 | 9/2003 | Comaniciu et al. |
| 7,146,026 B2 | 12/2006 | Russon et al. | | 2003/0202715 A1 | 10/2003 | Kinjo |
| 7,151,843 B2 | 12/2006 | Rui et al. | | 2003/0223622 A1 | 12/2003 | Simon et al. |
| 7,158,680 B2 | 1/2007 | Pace | | 2004/0022435 A1 | 2/2004 | Ishida |
| 7,162,076 B2 | 1/2007 | Liu | | 2004/0041121 A1 | 3/2004 | Yoshida et al. |
| 7,162,101 B2 | 1/2007 | Itokawa et al. | | 2004/0095359 A1 | 5/2004 | Simon et al. |
| 7,171,023 B2 | 1/2007 | Kim et al. | | 2004/0114904 A1 | 6/2004 | Sun et al. |
| 7,171,025 B2 | 1/2007 | Rui et al. | | 2004/0120391 A1 | 6/2004 | Lin et al. |
| 7,190,829 B2 | 3/2007 | Zhang et al. | | 2004/0120399 A1 | 6/2004 | Kato |
| 7,194,114 B2 | 3/2007 | Schneiderman | | 2004/0125387 A1 | 7/2004 | Nagao et al. |
| 7,200,249 B2 | 4/2007 | Okubo et al. | | 2004/0170397 A1 | 9/2004 | Ono |
| 7,218,759 B1 | 5/2007 | Ho et al. | | 2004/0175021 A1 | 9/2004 | Porter et al. |
| 7,227,976 B1 | 6/2007 | Jung et al. | | 2004/0179719 A1 | 9/2004 | Chen et al. |
| 7,254,257 B2 | 8/2007 | Kim et al. | | 2004/0218832 A1 | 11/2004 | Luo et al. |
| 7,269,292 B2 | 9/2007 | Steinberg | | 2004/0223063 A1 | 11/2004 | DeLuca et al. |
| 7,274,822 B2 | 9/2007 | Zhang et al. | | 2004/0223649 A1 | 11/2004 | Zacks et al. |
| 7,274,832 B2 | 9/2007 | Nicponski | | 2004/0228505 A1 | 11/2004 | Sugimoto |
| 7,289,664 B2 | 10/2007 | Enomoto | | 2004/0233301 A1 | 11/2004 | Nakata et al. |
| 7,295,233 B2 | 11/2007 | Steinberg et al. | | 2004/0234156 A1 | 11/2004 | Watanabe et al. |
| 7,315,630 B2 | 1/2008 | Steinberg et al. | | 2005/0013479 A1 | 1/2005 | Xiao et al. |
| 7,315,631 B1 | 1/2008 | Corcoran et al. | | 2005/0013603 A1 | 1/2005 | Ichimasa |
| 7,317,815 B2 | 1/2008 | Steinberg et al. | | 2005/0018923 A1 | 1/2005 | Messina et al. |
| 7,321,670 B2 | 1/2008 | Yoon et al. | | 2005/0031224 A1 | 2/2005 | Prilutsky et al. |
| 7,324,670 B2 | 1/2008 | Kozakaya et al. | | 2005/0041121 A1 | 2/2005 | Steinberg et al. |
| 7,324,671 B2 | 1/2008 | Li et al. | | 2005/0068446 A1 | 3/2005 | Steinberg et al. |
| 7,336,821 B2 | 2/2008 | Ciuc et al. | | 2005/0068452 A1 | 3/2005 | Steinberg et al. |
| 7,336,830 B2 | 2/2008 | Porter et al. | | 2005/0069208 A1 | 3/2005 | Morisada |
| 7,352,394 B1 | 4/2008 | DeLuca et al. | | 2005/0089218 A1 | 4/2005 | Chiba |
| 7,362,210 B2 | 4/2008 | Bazakos et al. | | 2005/0104848 A1 | 5/2005 | Yamaguchi et al. |
| 7,362,368 B2 | 4/2008 | Steinberg et al. | | 2005/0105780 A1 | 5/2005 | Ioffe |
| 7,403,643 B2 | 7/2008 | Ianculescu et al. | | 2005/0128518 A1 | 6/2005 | Tsue et al. |
| 7,437,998 B2 | 10/2008 | Burger et al. | | 2005/0140801 A1 | 6/2005 | Prilutsky et al. |
| 7,440,593 B1 | 10/2008 | Steinberg et al. | | 2005/0185054 A1 | 8/2005 | Edwards et al. |
| 7,460,694 B2 | 12/2008 | Corcoran et al. | | 2005/0275721 A1 | 12/2005 | Ishii |
| 7,460,695 B2 | 12/2008 | Steinberg et al. | | 2006/0006077 A1 | 1/2006 | Mosher et al. |
| 7,466,866 B2 | 12/2008 | Steinberg | | 2006/0008152 A1 | 1/2006 | Kumar et al. |
| 7,469,055 B2 | 12/2008 | Corcoran et al. | | 2006/0008171 A1 | 1/2006 | Petschnigg et al. |
| 7,471,846 B2 | 12/2008 | Steinberg et al. | | 2006/0008173 A1 | 1/2006 | Matsugu et al. |
| 7,515,740 B2 | 4/2009 | Corcoran et al. | | 2006/0018517 A1 | 1/2006 | Chen et al. |
| 7,536,036 B2 | 5/2009 | Steinberg et al. | | 2006/0029265 A1 | 2/2006 | Kim et al. |
| 7,565,030 B2 | 7/2009 | Steinberg et al. | | 2006/0039690 A1 | 2/2006 | Steinberg et al. |
| 7,620,214 B2 | 11/2009 | Chen et al. | | 2006/0050933 A1 | 3/2006 | Adam et al. |
| 2001/0005222 A1 | 6/2001 | Yamaguchi | | 2006/0056655 A1 | 3/2006 | Wen et al. |
| 2001/0028731 A1 | 10/2001 | Covell et al. | | 2006/0093213 A1 | 5/2006 | Steinberg et al. |
| 2001/0031142 A1 | 10/2001 | Whiteside | | 2006/0093238 A1 | 5/2006 | Steinberg et al. |
| 2001/0038712 A1 | 11/2001 | Loce | | 2006/0098875 A1 | 5/2006 | Sugimoto |
| 2001/0038714 A1 | 11/2001 | Masumoto et al. | | 2006/0098890 A1 | 5/2006 | Steinberg et al. |
| 2002/0081003 A1 | 6/2002 | Sobol | | 2006/0120599 A1 | 6/2006 | Steinberg et al. |
| 2002/0093577 A1 | 7/2002 | Kitawaki et al. | | 2006/0133699 A1 | 6/2006 | Widrow et al. |
| 2002/0105662 A1 | 8/2002 | Patton et al. | | 2006/0140455 A1 | 6/2006 | Costache et al. |
| 2002/0106114 A1 | 8/2002 | Yan et al. | | 2006/0147192 A1 | 7/2006 | Zhang et al. |

| | | |
|---|---|---|
| 2006/0153472 A1 | 7/2006 | Sakata et al. |
| 2006/0177100 A1 | 8/2006 | Zhu et al. |
| 2006/0177131 A1 | 8/2006 | Porikli |
| 2006/0187305 A1 | 8/2006 | Trivedi et al. |
| 2006/0203106 A1 | 9/2006 | Lawrence et al. |
| 2006/0203107 A1 | 9/2006 | Steinberg et al. |
| 2006/0204034 A1 | 9/2006 | Steinberg et al. |
| 2006/0204055 A1 | 9/2006 | Steinberg et al. |
| 2006/0204058 A1 | 9/2006 | Kim et al. |
| 2006/0210264 A1 | 9/2006 | Saga |
| 2006/0227997 A1 | 10/2006 | Au et al. |
| 2006/0228037 A1 | 10/2006 | Simon et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0018966 A1 | 1/2007 | Blythe et al. |
| 2007/0047768 A1 | 3/2007 | Gordon et al. |
| 2007/0053614 A1 | 3/2007 | Mori et al. |
| 2007/0070440 A1 | 3/2007 | Li et al. |
| 2007/0071347 A1 | 3/2007 | Li et al. |
| 2007/0091203 A1 | 4/2007 | Peker et al. |
| 2007/0098303 A1 | 5/2007 | Gallagher et al. |
| 2007/0110305 A1 | 5/2007 | Corcoran et al. |
| 2007/0110417 A1 | 5/2007 | Itokawa |
| 2007/0116379 A1 | 5/2007 | Corcoran et al. |
| 2007/0116380 A1 | 5/2007 | Ciuc et al. |
| 2007/0133901 A1 | 6/2007 | Aiso |
| 2007/0154095 A1 | 7/2007 | Cao et al. |
| 2007/0154096 A1 | 7/2007 | Cao et al. |
| 2007/0160307 A1 | 7/2007 | Steinberg et al. |
| 2007/0189748 A1 | 8/2007 | Drimbarean et al. |
| 2007/0189757 A1 | 8/2007 | Steinberg et al. |
| 2007/0201724 A1 | 8/2007 | Steinberg et al. |
| 2007/0201725 A1 | 8/2007 | Steinberg et al. |
| 2007/0201726 A1 | 8/2007 | Steinberg et al. |
| 2007/0263104 A1 | 11/2007 | DeLuca et al. |
| 2007/0273504 A1 | 11/2007 | Tran |
| 2007/0296833 A1 | 12/2007 | Corcoran et al. |
| 2008/0002060 A1 | 1/2008 | DeLuca et al. |
| 2008/0013798 A1 | 1/2008 | Ionita et al. |
| 2008/0013799 A1 | 1/2008 | Steinberg et al. |
| 2008/0013800 A1 | 1/2008 | Steinberg et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0143854 A1 | 6/2008 | Steinberg et al. |
| 2008/0144966 A1 | 6/2008 | Steinberg et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0219517 A1 | 9/2008 | Blonk et al. |
| 2008/0240555 A1 | 10/2008 | Nanu et al. |
| 2008/0266419 A1 | 10/2008 | Drimbarean et al. |
| 2008/0267461 A1 | 10/2008 | Ianculescu et al. |
| 2008/0292193 A1 | 11/2008 | Bigioi et al. |
| 2008/0316327 A1 | 12/2008 | Steinberg et al. |
| 2008/0316328 A1 | 12/2008 | Steinberg et al. |
| 2008/0317339 A1 | 12/2008 | Steinberg et al. |
| 2008/0317357 A1 | 12/2008 | Steinberg et al. |
| 2008/0317378 A1 | 12/2008 | Steinberg et al. |
| 2008/0317379 A1 | 12/2008 | Steinberg et al. |
| 2009/0002514 A1 | 1/2009 | Steinberg et al. |
| 2009/0003652 A1 | 1/2009 | Steinberg et al. |
| 2009/0003661 A1 | 1/2009 | Ionita et al. |
| 2009/0003708 A1 | 1/2009 | Steinberg et al. |
| 2009/0052749 A1 | 2/2009 | Steinberg et al. |
| 2009/0052750 A1 | 2/2009 | Steinberg et al. |
| 2009/0080713 A1 | 3/2009 | Bigioi et al. |
| 2009/0087030 A1 | 4/2009 | Steinberg et al. |
| 2009/0087042 A1 | 4/2009 | Steinberg et al. |
| 2009/0102949 A1 | 4/2009 | Steinberg et al. |
| 2009/0141144 A1 | 6/2009 | Steinberg |
| 2009/0179998 A1 | 7/2009 | Steinberg et al. |
| 2009/0196466 A1 | 8/2009 | Capata et al. |
| 2009/0208056 A1 | 8/2009 | Corcoran et al. |
| 2010/0026832 A1 | 2/2010 | Ciuc et al. |
| 2010/0026833 A1 | 2/2010 | Ciuc et al. |
| 2011/0002506 A1 | 1/2011 | Ciuc et al. |

FOREIGN PATENT DOCUMENTS

| | | |
|---|---|---|
| EP | 984386 A2 | 3/2000 |
| EP | 1128316 A1 | 8/2001 |
| EP | 1398733 A1 | 3/2004 |
| EP | 1441497 A2 | 7/2004 |
| EP | 1453002 A2 | 9/2004 |
| EP | 1626569 A1 | 2/2006 |
| EP | 1785914 A1 | 5/2007 |
| EP | 1887511 A1 | 2/2008 |
| EP | 2033142 A2 | 3/2009 |
| EP | 2052349 A1 | 4/2009 |
| GB | 2370438 A1 | 6/2002 |
| JP | 5260360 A2 | 10/1993 |
| JP | 2005-164475 A2 | 6/2005 |
| JP | 2006-005662 A2 | 1/2006 |
| JP | 2006-254358 A2 | 9/2006 |
| WO | 00/76398 A1 | 12/2000 |
| WO | WO-0133497 A1 | 5/2001 |
| WO | WO-02052835 A2 | 7/2002 |
| WO | WO-03028377 A1 | 4/2003 |
| WO | WO-2006045441 A1 | 5/2006 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | 2007128117 A1 | 11/2007 |
| WO | WO-2007142621 A1 | 12/2007 |
| WO | WO-2008015586 A2 | 2/2008 |
| WO | WO-2008015586 A3 | 2/2008 |
| WO | WO-2008017343 A1 | 2/2008 |
| WO | WO-2008018887 A1 | 2/2008 |
| WO | WO-2008023280 A2 | 2/2008 |
| WO | WO-2008054422 A2 | 5/2008 |
| WO | WO-2008104549 A2 | 9/2008 |
| WO | WO-2008107002 A1 | 9/2008 |
| WO | WO-2008107112 A2 | 9/2008 |
| WO | WO-2008131823 A1 | 11/2008 |
| WO | WO-2008150285 A1 | 12/2008 |
| WO | WO-2008157792 A1 | 12/2008 |
| WO | WO-2009039876 A1 | 4/2009 |
| WO | 2010/012448 A2 | 2/2010 |
| WO | 2010/012448 A3 | 6/2010 |

OTHER PUBLICATIONS

PCT International Preliminary Report on Patentability Chapter I (IB/373), for PCT Application No. PCT/EP2009/005461, report dated Feb. 1, 2011, 8 pages.

Aoki, Hiroyuki et al., "An Image Storage System Using Complex-Valued Associative Memories, Abstract printed from http://csdi.computer.org/comp/proceedings/icpr/2000/07502626abs.htm", International Conference on Pattern Recognition (ICPR'00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Buenaposada, J., "Efficiently estimating 1-3,16 facial expression and illumination in appearance—based tracking, Retrieved from the Internet: URL:http://www.bmva.ac.uk/bmvc/2006/ [retrieved on Sep. 1, 2008]", Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (EDS.): "Handbook of face recognition", XP002494037", 2005. chapter 3, Springer.

Cootes, T.F. et al., "A comparative evaluation of active appearance model algorithms", Proc. 9th British Machine Vision Conference. British Machine Vision Association, 1998, pp. 680-689.

Cootes, T.F. et al., "On representing edge structure for model matching", Proc. IEEE Computer Vision and Pattern Recognition, 2001, pp. 1114-1119.

Co-pending U.S. Appl. No. 12/026,484, filed Feb. 5, 2008.
Co-pending U.S. Appl. No. 12/055,958, filed Mar. 26, 2008.
Co-pending U.S. Appl. No. 12/063,089, filed Feb. 6, 2008.
Co-pending U.S. Appl. No. 12/198,533, filed Aug. 26, 2008.
Co-pending U.S. Appl. No. 12/198,621, filed Aug. 26, 2008.
Co-pending U.S. Appl. No. 12/302,493, filed Nov. 25, 2008.
Co-pending U.S. Appl. No. 12/331,334, filed Dec. 9, 2008.
Co-pending U.S. Appl. No. 12/333,221, filed Dec. 11, 2008.
Co-pending U.S. Appl. No. 12/374,040, filed Jan. 15, 2009.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Techincal Papers. International Conference on Consumer Electronics, 2006, pp. 339-340.

Crowley, J. et al., "Multi-modal tracking of faces for video communication, http://citeseer.ist.psu.edu/crowley97multimodal.html", In Computer Vision and Patent Recognition, 1997.

Dalton, John, "Digital Cameras and Electronic Color Image Acquisition, Abstract printed from http://csdl.computer.org/comp/proceedings/compcon/1996/7414/00/74140431abs.htm", C0MPC0N Spring '96—41st IEEE International Conference, 1996.

Demirkir, C. et al., "Face detection using boosted tree classifier stages", Proceedings of the IEEE 12th Signal Processing and Communications Applications Conference, 2004, pp. 575-578.

Deng, Ya-Feng et al., "Fast and Robust face detection in video, http://rlinks2.dialog.com/NASApp/ChannelWEB/DialogProServlet?ChName=engineering", International Conference on Machine Learning and Cybernetics, 2005.

Donner, Rene et al., "Fast Active Appearance Model Search Using Canonical Correlation Analysis", IEEE Transactions on Pattern Analysis and Machine Intelligence, 2006, pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

EPO Communication pursuant to Article 94(3) EPC, for European Patent Application No. 05 792 584A, paper dated May 13, 2008, 8 pages.

Feraud, R. et al., "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamforming and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers, Jan. 6, 2004.

Final Office Action mailed Nov. 18, 2009, for U.S. Appl. No. 11/554,539, filed Oct. 30, 2006.

Froba, B. et al., "Face detection with the modified census transform", Proceedings of the Sixth IEEE International Conference on Automatic Face and Gesture Recognition, 2004, pp. 91-96.

Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of lasted "Signal and Image Processing", 2002, pp. 1-6.

Gangaputra, Sachin et al., "A Unified Stochastic Model for Detecting and Tracking Faces, http://portal.acm.org/citation.cfm?id=1068818&coll=GUIDE&dl=GUIDE&CF-ID=6809268&CFTOKEN=82843223", Proceedings of the The 2nd Canadian Conference on Computer and Robot Vision (CRV 2005), 2005, pp. 306-313, vol. 00, IEEE Computer Society.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.

Gaubatz, Matthew et al., "Automatic Red-Eye Detection and Correction", IEEE ICIP, Proceedings 2002 international Conference on Image Processing, 2002, pp. 1-804-1-807, vol. 2—Issue 3.

Gerbrands, J., "On the Relationships Between SVD, KLT, and PCA", Pattern Recognition, 1981, pp. 375-381, vol. 14, Nos. 1-6.

Goodall, C., "Procrustes Methods in the Statistical Analysis of Shape, Stable URL:http://www.jstor.org/stable/2345744", Journal of the Royal Statistical Society. Series B (Methodological), 1991, pp. 285-339, vol. 53—Issue 2, Blackwell Publishing for the Royal Statistical Society.

Hayashi, S. et al., "A Detection Technique for Degraded Face Images", Conference on Computer Vision and Pattern Recognition, 2006, pp. 1506 1512, vol. 2, IEEE Computer Society.

Heisele, B. et al., "Hierarchical Classification and Feature Reduction for Fast Face Detection with Support Vector Machines", Pattern Recognition, 2003, pp. 2007-2017, vol. 36—Issue 9, Elsevier.

Hou, Xinwen et al., "Direct Appearance Models", IEEE, 2001, pp. I-828-I-833.

Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doIieeecomputersociety.org/10.1109/Recognition", 2nd International Conference on Automatic Face and Gesture Recognition (FG '96), IEEE Xplore, 2001, p. 248.

Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.

Isukapalli, Ramana et al., "Learning a dynamic classification method to detect faces and identify facial expression, http://rlinks2.dialog.com/NASApp/ChannelWEB/DialogProServlet?ChName=engineering", International Workshop on Analysis and Modelling of Faces and Gestures, AMFG 2005, In Lecture Notes in Computer Science, 2005, vol. 3723.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/

3dpvt/2002/1521/00/15210208abs.htm", 1st International Symposium on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf,", Pattern Recognition, 2001, pp. 95-109, vol. 34.

Lei et al., "CBIR Method Based on Color-Spatial Feature", IEEE Region 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Moghaddam, Baback et al., "Bayesian Modeling of Facial Similarity, http://citeseer.ist.psu.edu/article/moghaddam98bayesian.html", Advances in Neural Information Processing Systems (NIPS 1998), 1998, pp. 910-916.

Nayak et al., "Automatic illumination correction for scene enhancement and objection tracking, XP005600656, ISSN: 0262-8856", Image and Vision Computing, 2006, pp. 949-959, vol. 24—Issue 9.

NOn-Final Office Action mailed Aug. 19, 2009 for U.S. Appl. No. 11/773,815, filed Jul. 5, 2007.

Non-Final Office Action mailed Aug. 20, 2009, for U.S. Appl. No. 11/773,855, filed Jul. 5, 2007.

Non-Final Office Action mailed Jan. 20, 2010, for U.S. Appl. 12/262,024, filed Oct. 30, 2008.

Non-Final Office Action mailed Sep. 8, 2009, for U.S. Appl. No. 11/688,236, filed Mar. 19, 2007.

Nordstrom, M.M. et al., "The IMM face database an annotated dataset of 240 face images, http://www2.imm.dtu.dk/pubdb/p.php?3160", Informatics and Mathematical Modelling, 2004.

Notice of Allowance mailed Sep. 28, 2009, for U.S. Appl. No. 12/262,037, filed Oct. 30, 2008.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://csdi.computer.org/comp/proceedings/icip/1995/7310/03/73103137abs.htm", International Conference on Image Processing, 1995, vol. 3.

PCT International Preliminary Report on Patentability (IPRP) for PCT Application PCT/EP2005/011010, dated Jan. 23, 2007, 18 pages.

PCT International Preliminary Report on Patentability (IPRP) for PCT Application PCT/EP2007/009763, dated Sep. 11, 2009, 8 pages.

PCT International Search Report and Written Opinion of the International Searching Authority, or the Declaration, for PCT Application No. PCT/US2006/021393, filed Jun. 2, 2006, paper dated Mar. 29, 2007, 12 pgs.

PCT International Search Report and Written Opinion of the International Searching Authority, or the Declaration, for PCT Application No. PCT/US2006/060392, filed Oct. 31, 2006, paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration for PCT Application No. PCT/US2006/032959, dated Mar. 6, 2007, 8 pages.

PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the international Searching Authority, or the Declaration, for PCT Application No. PCT/EP2007/005330, filed Jun. 18, 2007, paper dated Sep. 28, 2007, 11 pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2007/009763, paper dated Jun. 17, 2008, 11 pages.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No. PCT/IB2007/003724, dated Aug. 28, 2008, 9 pages.

PCT Notification of Transmittal of the International Search Report and the Written Opinion of the International Searching Authority, or the Declaration, for PCT Application No. PCT/US2008/067746, dated Sep. 10, 2008, 8 pages.

Romdhani, S. et al., "Face Identification by Fitting a 3D Morphable Model using linear Shape and Texture Error Functions, XP003018283", European Conference on Computer Vision, 2002, pp. 1-15.

Roux, Sebastien et al., "Embedded Convolutional Face Finder,Multimedia and Expo, XP031032828, ISBN: 978-1-4244-0366-0", IEEE International Conference on IEEE, 2006, pp. 285-288.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998, pp. 23-38, p. 92, vol. 20—issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging. [Online], Available: citeseer.ist.psu.edu/sharma97digital.html", IEEE Transactions on Image Processing, 1997, pp. 901-932, vol. 6—Issue 7.

Shock, D. et al., "Comparison of Rurai Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication ( IMAC '95), 1995.

Sim, T. et al., "The CMU Pose, Illumination, and Expression (PIE) Database of Human Faces Robotics Institute, Tech. Report, CMU-RI-TR-01-02", 2001, 18 pgs, Carnegie Mellon University.

Sim, T. et al., "The CMU Pose, Illumination, and Expression (PIE) database, Automatic Face and Gesture Recognition", Fifth IEEE Intl. Conf, IEEE Piscataway, NJ, USA, 2002, 6 pages.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", International Conference on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc, 1998, pp. 163-167, vol. 3.

Song, Hong et al., "Face detection and segmentation for video surveillance Language: Chinese. http://rlinks2.dialog.com/NASApp/ChannelWEB/DialogProServlet?ChName=engineering", Binggong Xuebao/Acta Armamentarii, 2006, pp. 252-257, vol. 27—Issue 2.

Soriano, M. et al., "Making Saturated Facial Images Useful Again, XP002325961, ISSN: 0277-786X", Proceedings of the SPIE, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp, 1-12, vol. 2420.

Sublett, J.W. et al., "Design and Implementation of a Digital Teleultrasound System for Real-Time Remote Diagnosis, Abstract printed from http://csdi.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdi.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd International Conference on Information Technology for Application, 2004, pp. 305-310.

Tkalcic, M. et al., "Colour spaces perceptual, historical and applicational background, ISBN: 0-7803-7763-X", IEEE, EUROCON, 2003, pp. 304-308, vol. 1.

Turk, Matthew et al., "Eigenfaces for Recognition", Journal of Cognitive Neuroscience, 1991, 17 pgs, vol. 3—Issue 1.

Turkan, Mehmet et al., "Human face detection in video using edge projections, Conference: Visual Information Processing XV, http://rlinks2.dialog.com/NASApp/ChannelWEB/DialogProServlet?ChName=engineering", Proceedings of SPIE—The International Society for Optical Engineering Visual Information Processing, 2006, vol. 6246.

Twins Crack Face Recognition Puzzle, Internet article http://www.cnn.com/2003/TECH/ptech/03/10/israel.twins.reut/ index.html, printed Mar. 10, 2003, 3 pages.

U.S. Appl. No. 10/608,772, entitled "Method of improving orientation and color balance of digital images using face detection information", (filed on Jun. 26, 2003).

U.S. Appl. No. 11/554,539, filed Oct. 30, 2006, entitled Digital Image Processing Using Face Detection and Skin Tone Information.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdi.computer.org/comp/trans/tp/1990/02/i0148abs.htm" IEEE Transactions on Pattern Analysis and Machine Intelligence, 1990, 1 page.

Wan, S.J. et al., "Variance-based color image quantization for frame buffer display", S. K. M. Wong Color Research & Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming Hsuan et al., "Face Detection and Gesture Recognition for Human-Computer Interaction", 2004, p. 33-p. 35, Kluwer Academic.

Yang, Ming-Hsuan et al., "Detecting Faces in Images: A Survey, ISSN:0162-8828, http://portal.acm.org/citation.cfm?id=505621&coll=GUIDE&dl=GUIDE&CFID=680-9268&CFTOKEN=82843223.", IEEE Transactions on Pattern Analysis and Machine Intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300, http://portal.acm.org/citation.cfm?id=954342&coll=GUIDE&di=GUIDE&CFID=680-9268&CFTOKEN=82843223.", ACM Computing Surveys (CSUR) archive, 2003, pp. 399-458, vol. 35—Issue 4, ACM Press.

Zhu Qiang et al., "Fast Human Detection Using a Cascae of Histograms of Oriented Gradients" Proceedings of the 2006 IEEE Computer Society Conference on Computer Vision and Pattern Recognition, 2006, pp. 1491-1498, IEEE Computer Society.

Non-Final Rejection, dated Nov. 21, 2011, for U.S. Appl. No. 12/512,819, filed Jul. 30, 2009.

Non-Final Rejection, dated Dec. 1, 2011, for U.S. Appl. No. 12/512,843, filed Jul. 30, 2009.

Yao, Christina: Image Cosmetics: An automatic Skin Exfoliation Framework on Static Images, UCSB Four Eyes Lab Imaging, Interaction, and Innovative Interfaces Publications Thesis, Master of Science in Media Arts and Technology Dec. 2005, pp. I-83, XP002575131 University of California Retrieved from the Internet: URL:http://ilab.cs.ucsb.edu/publications/YaoMS.pdf> [retrieved on Mar. 25, 2010].

* cited by examiner

FIGURE 1A
FIGURE 1B: after applying selective smoothing/blur

AUTOMATIC FACE AND SKIN BEAUTIFICATION USING FACE DETECTION

PRIORITY AND RELATED APPLICATIONS

This application claims the benefit of priority to U.S. provisional patent application No. 61/084,942, filed Jul. 30, 2008, which is incorporated by reference. This application is one of three applications filed contemporaneously by these same inventors.

BACKGROUND

1. Field of Invention

The invention relates to image processing, particularly of detected sub-regions within face images.

2. Description of the Related Art

Proctor and Gamble's U.S. Pat. No. 6,571,003 mentions finding and fixing facial defects such as spots, wrinkles, pores, and texture in sub-regions of faces, e.g, cheeks or in areas defined by landmark points such as corner or nose, eye, or mouth. The technique involves replacing the defined region with a mask. The P&G patent discloses to electronically alter the color.

The P&G patent also mentions detecting and correcting lighting gradients and lighting variances. These lighting gradients, or variances, appear to involve instances where there is directional lighting which may cause a sheen or brighter region on the facial skin. U.S. patent application Ser. Nos. 12/038,147, 61/106,910 and 61/221,425, which are assigned to the same assignee as the present application and are hereby incorporated by reference, describe techniques which use Viola-Jones type classifier cascades to detect directional lighting. However, determining and correcting a lighting gradient would typically involve global analysis, exceptions being possible in combination with face-tracking techniques such as those described at U.S. Pat. Nos. 7,403,643 and 7,315,631 and U.S. application Ser. Nos. 11/766,674, published as 2008/0037840, and 12/063,089, 61/120,289, and 12/479,593, which are all assigned to the same assignee as the present application and are hereby incorporated by reference. It is desired to have a technique that uses a local blurring kernel rather than such techniques involving less efficient global analysis for certain applications and/or under certain conditions, environments or constraints Kodak's U.S. Pat. No. 7,212,657 illustrates at FIGS. 13-14 to generate a shadow/peak image (based on generating a luminance image and an average luminance image), a blur image, and blended images. The Kodak patent states that a shadow/highlight strength image is generated by subtracting an average luminance image from a luminance image. Also, at FIG. 16, the Kodak patent shows element 1530 is labeled as "generate luminance and chrominance scaling factors using peak/valley map and color info", and element 1540 is labeled as "modify luminance and chrominance of pixels within mask regions". Face detection is described in the Kodak patent, but not face tracking.

The Kodak technique, like the P&G technique, involves global image manipulations, i.e., the "luminance image" is not indicated as including anything less than the entire image, the "blur image" involves the application of a kernel to the entire image, and the "blended image" involves three copies of the global image. The "blur image" involves chrominance and luminance data meaning that a lot of memory is used for manipulating the image, particularly if the application involves a resource constrained embedded system. Regarding luminance and chrominance scaling factors, even if they involve localized scaling factors, they are not described in the Kodak patent as being generated for application to anything less than the entire image.

U.S. patent application Ser. Nos. 11/856,721 and 12/330,719, which are assigned to the same assignee as the present application and are hereby incorporated by reference, describes a technique that can be applied as a single, raster-like, scan across relevant regions of an image without involving global analysis or a determination of global properties such as the average luminance image, or a shadow or blur image. Such single-pass scan through predetermined regions provides a far more efficient and suitable technique for embedded systems such as digital cameras than either of the P&G or Kodak patents.

The Hewlett Packard (HP) published patent application 2002/008.1003 mentions air-brushing which typically involves applying color over a swath of an image, e.g., such as may include a blemish or wrinkle. The HP publication also mentions blurring over a wrinkle on an image of a person's face, and again specifically describes blurring or blending color values defining the wrinkles and surrounding skin. The HP application mentions changing brightness to brighten or darken a facial feature, such as to shade a facial feature, and goes on to describe changing color values of skin associated with the feature to shade the feature. The HP patent further discloses to sharpen a hair line and/or blur a forehead and/or cheeks, by blurring color values. Face detection and face tracking over multiple images, full resolution or low resolution and/or subsample reference images such as previews, postviews and/or reference images captured with a separate imaging system before, during or after capturing of a main full-resolution image are not described in the HP patent, nor is there any suggestions to smooth or blur luminance data of a digital face image.

Portrait is one of the most popular scenes in digital photography. Image retouching on portrait images is a desirable component of an image processing system. Users can spend a lot of time with conventional software trying to make a portrait nicer by hiding wrinkles and blemishes. It is desired to provide an innovative automatic portrait scene enhancer, which is suitable for an embedded device, such as a digital still camera, camera-phone, or other handheld or otherwise portable consumer appliance having image acquisition components (e.g., lens, image sensor) and a processor.

SUMMARY OF THE INVENTION

A method is provided for enhancing an appearance of a face within a digital image using a processor. An image is acquired of a scene including a face. The face is identified within the digital image. One or more sub-regions to be enhanced with localized luminance smoothing are identified within the face. One or more localized luminance smoothing kernels are applied each to one of the one or more sub-regions identified within the face to produce one or more enhanced sub-regions of the face. The one or more localized smoothing kernels are applied to luminance data of the one or more sub-regions identified within the face. An enhanced image is generated including an enhanced version of the face including certain original pixels in combination with pixels corresponding to the one or more enhanced sub-regions of the face. The enhanced image and/or a further processed version is displayed, transmitted, communicated and/or digitally stored and/or otherwise output.

The localized luminance smoothing may include blurring or averaging luminance data, or a combination thereof.

One or more localized color smoothing kernels may be applied to the one or more sub-regions. The one or more enhanced sub-regions of the corrected image may also include pixels modified from original or otherwise processed pixels of the face at least by localized color smoothing.

Noise reduction and/or enhancement may be applied to the one or more sub-regions. The one or more enhanced sub-regions of the corrected image may also include pixels modified from original or otherwise processed pixels of the face at least by localized noise reduction and/or enhancement.

Certain non-skin tone pixels within the one or more sub-regions of the face may be determined not to have a threshold skin tone. These non-skin tone pixels may be removed, replaced, reduced in intensity, and/or modified in color.

Enhanced pixels of the one or more enhanced sub-regions may include enhanced intensities which comprise one or more functions of a relationship between original pixel intensities and local average intensities within the one or more original and/or enhanced sub-regions.

One or more mouth and/or eye regions may be detected within the face. A natural color of one or more sub-regions within the one or more mouth and/or eye regions may be identified and enhanced. These sub-regions may include one or more teeth, lips, tongues, eye whites, eye brows, iris's, eye lashes, and/or pupils.

The face may be classified according to its age based on comparing one or more default image attribute values with one or more determined values. One or more camera acquisition and/or post-processing parameters may be adjusted based on the classifying of the face according to its age.

A digital image acquisition device is also provided, including a lens, an image sensor and a processor, and a processor-readable memory having embodied therein processor-readable code for programming the processor to perform any of the methods described herein, particularly for enhancing an appearance of a face or other feature within a digital image.

One or more processor-readable media are also provided that have embodied therein code for programming one or more processors to perform any of the methods described herein.

In certain embodiments, face tracking using previews, postviews or other reference images, taken with a same or separate imaging system as a main full resolution image is combined with face beautification. This involves smoothing and/or blurring of face features or face regions, wrinkle/blemish removal, or other digital cosmetic adjustments. In certain embodiments, a luminance channel is used for smoothing an unsightly feature, while in a narrow subset of these, only the luminance channel is used for smoothing without using any color channel. Other embodiments used one or more color channels in addition to the luminance channel, and these may or may not also use face tracking.

In certain embodiments, localized modification of a region of a face is performed based on an average of the pixel values surrounding a particular pixel. This localized averaging/blurring kernel may be applied solely on the luminance channel, thereby reducing computation in an embedded system such as a portable digital camera, camera-phone, camera-equipped handheld computing device, etc.

A single-pass filtering kernel may be configured to act only on local luminance values within pre-determined regions of the image, and may be combined with a binary skin map. This is far more efficient, using less memory and executing more quickly, within an embedded imaging system such as a digital camera.

Blurring or shading may be achieved by changing selected luminance values of one or more sub-regions of a face. An embodiment involves applying or subtracting luminance over a swath of an image, e.g., such as may include a blemish or wrinkle. Blurring may also be applied to a facial feature region that includes a wrinkle on an image of a person's face. Blurring and/or blending luminance values of a face feature region, e.g., temple region, side of nose, forehead, chin, cheek region) defining the wrinkles and surrounding skin. Brightness may be changed to brighten or darken a facial feature, such as to shade a facial feature, and this may be achieved by changing luminance values of skin associated with the feature to shade or brighten the feature.

In certain embodiment, a technique is provided including in-camera processing of a still image including one or more faces as part of an acquisition process. The technique includes identifying a group of pixels including a face within a digitally-acquired still image on a portable camera. One or more first processing portions of the image is determined including the group of pixels (the first portion may be characterized as foreground). One or more second processing portions of the image other than the group of pixels is then determined (and may be characterized as background). The technique may include automatically in-camera processing the first processing portion with a determined level of smoothing, blurring, noise reduction or enhancement, or other skin enhancement technique involving one or more luminance components of the pixels, while applying substantially less or no smoothing, blurring, noise reduction or enhancement or otherwise to the second processing portion to generate a processed image including the face. The processed image or a further processed version including the face is then stored, displayed, transmitted, communicated, projected or otherwise controlled or output such as to a printer, display other computing device, or other digital rendering device for viewing the in-camera processed image. The method may include generating in-camera, capturing or otherwise obtaining in-camera a collection of low resolution images including the face, and determining the first processing portion including analyzing the collection of low resolution images. The analyzing may include tracking the face within the collection of low resolution images.

A further method is provided for enhancing an appearance of a face within a digital image. A digital image of a scene including a face is acquired using a processor. The image is captured using a lens and an image sensor, and/or the image is received following capture by a device that includes a lens and an image sensor. The face is identified within the digital image. Skin tone portions of the face are segmented from face features including one or two eyes or a mouth or combinations thereof. Within the skin tone portions of the face, one or more blemish regions that vary in luminance at least a threshold amount from non-blemished skin tone portions are identified. Luminance data of the one or more blemish regions is smoothed to generate smoothed luminance data. An enhanced image is generated including an enhanced version of the face that has original luminance data of the one or more blemish regions replaced with the smoothed luminance data and combined with original non-blemished skin tone portions. The enhanced image and/or a further processed version is/are displayed, transmitted, communicated, digitally stored and/or otherwise output.

The localized luminance smoothing may include blurring and/or averaging luminance data.

The method may include applying one or more localized color smoothing kernels to the one or more sub-regions. The one or more enhanced sub-regions of the corrected image further may include pixels modified from original pixels of the face at least by localized color smoothing.

The method may include applying noise reduction or enhancement, or both, to the one or more sub-regions. The one or more enhanced sub-regions of the corrected image may include pixels modified from original pixels of the face at least by localized noise reduction and/or enhancement.

The method may include determining certain non-skin tone pixels within the one or more sub-regions that do not comprise a threshold skin tone, and removing, replacing, reducing an intensity of, or modifying a color of said certain non-skin tone pixels, or combinations thereof.

Enhanced pixels of the one or more enhanced sub-regions may include enhanced intensities which comprise one or more functions of a relationship between original pixel intensities and local average intensities within the one or more original and/or enhanced sub-regions.

The method may include detecting one or more mouth and/or eye regions within the face, and identifying and enhancing a natural color of one or more sub-regions within the one or more mouth or eye regions, including one or more teeth, lips, tongues, eye whites, eye brows, iris's, eye lashes, or pupils, or combinations thereof.

A further method is provided for enhancing an appearance of a face within a digital image. A processor is used to generate in-camera, capture or otherwise obtain in-camera a collection of one or more relatively low resolution images including a face. The face is identified within the one or more relatively low resolution images. Skin tone portions of the face are segmented from face features including one or two eyes or a mouth or combinations thereof. Within the skin tone portions of the face, one or more blemish regions are identified that vary in luminance at least a threshold amount from the skin tone portions. A main image is acquired that has a higher resolution than the one or more relatively low resolution images. The main image is captured using a lens and an image sensor, or received following capture by a device that includes a lens and an image sensor, or a combination thereof. The method further includes smoothing certain original data of one or more regions of the main image that correspond to the same one or more blemish regions identified in the relatively low resolution images to generate smoothed data for those one or more regions of the main image. An enhanced version of the main image includes an enhanced version of the face and has the certain original data of the one or more regions corresponding to one or more blemish regions replaced with the smoothed data. The enhanced image and/or a further processed version is/are displayed, transmitted, communicated and/or digitally stored or otherwise output.

The method may include tracking the face within a collection of relatively low resolution images.

The smoothing may include applying one or more localized luminance smoothing kernels each to one of the one or more sub-regions identified within the face to produce one or more enhanced sub-regions of the face. The one or more localized luminance smoothing kernels may be applied to luminance data of the one or more sub-regions identified within said face. The localized luminance smoothing may include blurring and/or averaging luminance data. The method may also include applying one or more localized color smoothing kernels to the one or more sub-regions. The one or more enhanced sub-regions of the corrected image may include pixels modified from original pixels of the face at least by localized color smoothing.

The method may also include applying noise reduction and/or enhancement to the one or more sub-regions. The one or more enhanced sub-regions of the corrected image may include pixels modified from original pixels of the face at least by localized noise reduction and/or enhancement.

Certain non-skin tone pixels may be determined within the one or more sub-regions that do not comprise a threshold skin tone. The method may include removing, replacing, reducing an intensity of, and/or modifying a color of such non-skin tone pixels.

Enhanced pixels of the one or more enhanced sub-regions may include enhanced intensities which have one or more functions of a relationship between original pixel intensities and local average intensities within the one or more original and/or enhanced sub-regions.

One or more mouth and/or eye regions may be detected within the face. A natural color may be identified and enhanced for one or more sub-regions within the one or more mouth and/or eye regions, including one or more teeth, lips, tongues, eye whites, eye brows, iris's, eye lashes, and/or pupils.

BRIEF DESCRIPTION OF THE DRAWINGS

FIG. 1A-1B illustrate unprocessed and processed images of a face, where the processing involves applying selective smoothing or blur to regions of the face.

STATEMENT REGARDING COLOR DRAWINGS

Figure 2A:
FIGS. 2A-2C illustrate identification of regions of a face, and processed and unprocessed version of a face image, wherein the processing involves application of selective smoothing or, blurring of certain regions of the face.

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Using at least one reference image, and in certain embodiments more than one reference image, including a face region, the face region is detected. In those embodiments wherein multiple reference images are used, a face region is preferably tracked. Face detection and tracking are performed preferably in accordance with one or more techniques described in the US patents and US patent applications listed above and below and which are incorporated by reference here.

Given an input image and one or more, preferably two or more, smaller, subsampled, and/or reduced resolution versions of die input image (e.g., one QVGA and one XGA), the position of a face and of the eyes of the face within the input image are determined using face detection and preferably face tracking. FIG. 1A shows an example of an unprocessed image including a face, or at least an image of a face with original image data or image data that has been otherwise processed than by selective localized smoothing or blurring such as is described with reference to embodiments herein. The face beautification method applies a selective blur, and/or other smoothing such as localized averaging or according to one or more of the methods specifically described below, which enhances the skin, e.g., softening and/or reducing wrinkles and/or spots. FIG. 1A illustrates an unprocessed image of a face before applying selective smoothing. FIG. 1B illustrates a processed version of the image of the face of FIG. 1A, i.e., after applying selective smoothing to certain sub-regions of the face.

In an exemplary embodiment, the method may be performed as follows. Certain sub-regions of the face are identified, e.g., rectangular sub-regions or other polygonal or curved or partially-curved sub-regions with or without one or more cusps or otherwise abrupt segmental intersections or discontinuities. These sub-regions may be places where it will be desired to apply selective smoothing, or these sub-regions may be those places outside of which it is desired to apply the selective smoothing, or a combination of these. For example, three sub-regions such as two eyes and a mouth may be identified for not applying selective smoothing, and/or four sub-regions such as a forehead, two cheeks and a chin may be specifically selected for applying localized luminance smoothing.

Now, in the embodiment where the two eye and mouth are identified, the skin around these facial sub-regions/rectangles is detected. This can include in certain embodiments creating a binary skin image, including segmenting the QVGA version of the image. In one embodiment, this involves thresholding done in YCbCr.

A larger rectangle or other shape may be defined around the face as a whole. That is, outside of this larger facial shape, it may be desired in most embodiments herein not to apply the selective smoothing (although there may be other reasons to smooth or blur a background or other region around a detected face in a digital image, such as to blur a background region in order to highlight a face in the foreground; see, e.g., U.S. Pat. No. 7,469,071 and U.S. application Ser. No. 12/253,839, which are assigned to the same assignee and are hereby incorporated by reference). A skin map may be filtered by morphological operations. The largest regions inside the face may be selected to be kept, and regions may be selected based on other criteria such as overall luminance, a certain threshold luminance contrast such as may be indicative of wrinkled skin, a color qualification such as a certain amount of red, a spotty texture, or another unsatisfactory characteristic of a region or sub-region of a face. Lip detection may be performed based on color information (Cr component) and/or on the position of the eyes, nose and/or ears or other face feature such as chin, cheeks, nose, facial hair, hair on top of head, or neck, and/or on a shape detector designed for specifically detecting lips.

The skin inside of one or more face regions, not including the eye and mouth regions, is corrected. In certain embodiments this involves skin pixels from inside a face region having their luminance component replaced with different luminance values, such as an average value of its neighbors, e.g., substantially all or a fair sampling of surrounding skin pixels, or all of a majority of pixels from one direction as if the pixels were being replaced by blurred pixels caused by relative camera-object movement in a certain direction. Smoothing can include an averaging process of skin pixels from other regions of the face, and/or can be a calculation other than averaging such as to prioritize certain pixels over others. The prioritized pixels may be closest to the pixel being replaced or may have a color and/or luminance with greater correlation to a preferred skin tone.

Certain criteria may be applied as requirement(s) for correcting a region within an image. For example, it may be set as requisite that the region be inside a face, although alternatively the skin of a person's neck, leg, arm, chest or other region may be corrected. It may be set as requisite that the luminance component be within a certain range. That range may depend on an average luminance of the skin within the certain face or a preferred luminance or a selected luminance. The certain pixel may be selected or not selected depending on its relation with other details within the face (e.g., eyes, nose, lips, ears, hair, etc.). The number of neighbors used when modifying the current pixel (i.e., the kernel size) may be varied depending on the size of the face versus the size of the image, or on a standard deviation of luminance values, and/or other factors may be taken into account such as the resolution or a determination as to how much fixing the particular face region or sub-region ought to receive. If the face is too small compared to the image (e.g., the face uses below a threshold percentage of the available pixel area, then the system can be set to apply no correction of wrinkles, spots, etc., because such undesired features may not be visible anyway. The averaging or other smoothing or blurring may be done on a XGA image in order to improve speed.

Localized Blurring/Smoothing Kernel(s)

The blurring kernel or smoothing kernel in certain embodiments may be changed, adjusted, selected, and/or configured based on one or more factors specific to the image and/or group of images based upon which a corrected image is to be generated. A factor may be relative size of the facial image to that of the main picture. Other factors may include resolution of the face region and/or the entire image, processing capacity and/or RAM or ROM capacity, and/or display, projection or transmission capacity of an embedded device or processing or rendering environment with which the image is acquired, processed and/or output.

The blurring kernel may include a table, formula, calculation and/or plot of face sizes (e.g., 5% of image, 10% of image, 20% of image, etc) versus kernel sizes (e.g., 3×3, 4×4, 5×5, etc.) The kernel may also be adjusted based the relative location of the sub-region within a face. The kernel applied to the cheeks may be configured to blur cheeks effectively, while a different kernel to apply to the skin around the eyes may be configured to blur/smooth that skin most effectively, same for the skin in the forehead, the skin around the mouth/chin, etc. A different kernel can be applied to a bearded region or other hair region or no smoothing may be applied to such regions. In a specific, simple example embodiment, the blurring/smoothing kernel is smaller when faces are smaller (two or more levels or one or more thresholds may be used). The blurring kernel may decrease working around eyes or lips or nose or bearded regions or low luminance regions or dark colored regions. The blurring kernel may depend on average luminance around the point of interest.

The method in certain embodiments may include the application of selective skin enhancement and/or noise removal. This provides an alternative approach to determining the facial regions when a beautification filter or blurring/smoothing kernel might not be applied.

An Alternative Implementation: Lee-Based Filtering

A face beautifier may use certain relevant data gathered in a face tracking technique as described in reference cited herein and incorporated by reference (see below). That information may include a position of the face and/or a feature within the face such as one or both eyes, mouth or nose, information relating to where skin is detected and its tone, luminance, shaded areas, direction relative to incoming light, etc. That data can also include the Cb,Cr,Y range within the face area, and/or backlighting image information.

Application to Luminance Channel

The technique according to certain embodiments may employ modifications of the luminance channel to achieve the filtering of the skin. Data relating to variance within the luminance channel may also be used, and texture information of the skin of the face region or sub-region may be used. Such texture information may include certain chrominance data, but may also include only luminance data which defines such texture within the image. The variance on luminance may be utilized when selecting and/or performing blurring/smoothing, and may be applied specifically to separating wrinkles (which are typically rather isolated) from the texture of the face of a shaved man or even an unshaved man (where variance is high). The texture information may involve a measure of to what degree areas or sub-regions are uniform or not. The texture information may include a recognized or learned or newly-analyzed pattern, which can be analyzed either on the luminance channel only and/or also on one or more color channels.

In certain embodiments, only face and eyes may be mandatory, while in others certain other features may be required. Face tracking may be used but is not required for the technique to provide tremendous advantage in beautifying a face. The location of a face within an image may be gathered using face detection only or using face tracking. A dynamic skin-map and/or contrast info may be gathered using face tracking.

Within a digital camera or real-time imaging appliance, a real-time face tracking subsystem (operable on a sequence of preview, postview or other reference images independent of the main image) may be operated, and on acquisition of a main image, facial enhancements may be performed based on (i) an analysis of the facial region in the main acquired image and (ii) an analysis of face region metadata determined from the real-time face tracking subsystem.

Facial Image Enhancement

Apart from the image to be enhanced, the algorithm may use (if available) extra information, including the position of the face(s) and eyes in the given image which will help limiting the area of search, and two resized copies of the initial image (e.g.: one QVGA and one XGA). These two images may be used for faster processing power where accuracy is less critical.

An example algorithm according to certain embodiments may be described as follows:

Enhancement Map Detection

Based on face information, skin tones similar to those inside a face rectangle are sought in the entire image. In detail, for each face passed, the steps may be as follows in one example embodiment (not necessarily in the order discussed below):

Compute the average saturation for the region of interest (entire face rectangle or other shape in this case). To avoid problems in cases such as side illumination, the average saturation for the entire image may also computed and the minimum between the two may be used.

The relevant skin tone information (from the face rectangle) is extracted. This is done by geometrical considerations (and additionally by color filtering). In one implementation this means: top, left and right of the rectangle are changed in such a way that $1/5$ of each side is not taken into account. Bottom (based on image orientation) stays the same or not depending on whether it is deemed important to have the neck included. One implementation of color filtering may be the elimination or reduction of luminance or change of color of pixels which are determined to have non-skin tones (e.g. blue pixels).

PCA (Principal Component Analysis) procedure may be applied on remaining pixels. A pixel may be given by a triplet. The covariance matrix of the given pixels is computed. The eigenvectors and eigenvalues of the covariance matrix are then found. The three resulting eigenvectors represent the axes of a new 3D coordinate system. The two least important axes (corresponding to the two smallest eigenvalues) are further considered.

The coordinates of all inspected pixels on the two above-mentioned axes are computed. The two histograms of the absolute value of the coordinates are then computed: one histogram for each axis. For each of the two histograms, an acceptance threshold may be determined, for example, using the following procedure. The corresponding cumulative histogram H is computed. The threshold is taken such as to delimit a given percentage of the total number of pixels (i.e., threshold Th is taken such as H(Th)~=p %, with p being a predefined value). By choosing different values for p one can vary the strength of the skin filtering. For example values taken for p may vary from 90.0% (for strong filtering) up to 97.5% (for permissive filtering).

Compute the coordinates of each image pixel on the two axes resulting after the PCA step and check if the absolute values are smaller than the thresholds obtained in the previous step.

For a pixel to be considered skin type further verification may be done. An example is to check that saturation is large enough in the YUV color space. Based on the average saturation computed in the first stage, each pixel may be verified to have at least one of the U and V values large enough. Also the luminance level of the pixel is checked to be in a predefined gamut. This is because we do not want to beautify dark hair or too bright areas where color information is not reliable In the same time: a generic skin detection algorithm (e.g. simple thresholding on the YUV space) may be applied on the entire image to obtain a less reliable but more inclusive skin map. The role of the generic skin map may be manifold, as it may replace the PCA skin map in cases where face information is not present. The skin map may also used to improve the PCA skin map by helping in deciding if holes in the map are going to be filled. The skin map may add up to the PCA skin map "uncertain skin pixels", or pixels with a lower confidence which are to be treated separately by the correction block.

The skin map may now be cleaned up by applying spatial filtering such as morphological operations. At this point the skin map may have two levels of confidence: PCA skin (high confidence) and uncertain skin (low confidence). The number of levels of confidence may be further increased by taking into consideration the spatial positioning of a skin pixel inside the skin area. In one implementation, the closer one pixel is to the interior of the map, the higher its confidence is set. In another implementation, the number of skin confidence levels could be increased from the PCA thresholding stage by using multiple thresholding of pixel coefficients on the PCA axes.

Enhancement Map Correction

The skin pixels from inside the faces (or the ones from regions that passed skin filtering when no face is present) are corrected. An example process for performing this correction is described below.

A weight $\alpha \in [0,1]$ $\alpha$ may be computed for each pixel describing how much correction it will receive. The higher the value of $\alpha$, the more correction will be applied to that pixel. The weight may be based on the local standard-deviation computed on the XGA intensity image over a squared neighborhood (e.g. 16×16 for large-size skin areas, or 8×8 for medium-sized skin areas), but may also take into account other factors (e.g., the skin level of confidence, the proximity of the pixel to face features, such as eyes and mouth etc.)

Initially, α is computed as: $\alpha=\alpha_{skin}/\alpha_{local}$, where $\alpha_{skin}$ is the standard deviation computed over the whole skin area, while $\alpha_{local}$ is the local standard deviation. Then α is limited to 1.

α may be increased by a predefined factor (e.g., 1.1-1.25) for pixels having higher confidence of skin.

α may be decreased by a predefined factor for pixels located in the vicinity of face features, such as eyes and mouth (see FIG. 1). (For eye and mouth detection, see chapter on eye and mouth beautification).

Special attention may be given to pixels located near the skin border. In this example, for those pixels, $\sigma_{local}$ is higher owing to the fact that there is a strong edge in the computing neighborhood. In these cases, the direction of the edge is sought (only the four main directions are considered) and, based on it, the most uniform sub-window of the current window is used for recomputing a and the local average.

α may also modified based on the relationship between the intensity of the current pixel and the local average (computed over the same neighborhood as $\sigma_{local}$). This is because face artifacts that are attempted to be eliminated by face beautification (e.g, freckles, pimples, wrinkles) may be typically darker than skin, but not very dark.

In one embodiment, the following modification may be performed: if the current intensity is greater than the local average, decrease a (high intensity, therefore, strongly reduce correction). If the current intensity is much lower than the local average, decrease α (too dark to be a face artifact, strongly reduce correction). If the current intensity is lower than the local average, but the difference between the two is small, increase α (very likely face artifact, therefore increase correction). If the current intensity is lower than the local average, and the difference between them is important, slightly decrease α (less likely to be a face artifact, therefore slightly reduce correction).

Apply correction on the intensity value, based on the relation:

$$\text{NewIntensity}=\alpha\cdot\text{LocalAverage}+(1-\alpha)\cdot\text{OldIntensity}$$

The averaging may be computed on the same intensity image used for the weighting map (XGA image). This improves speed without affecting quality.

Figure 2B:
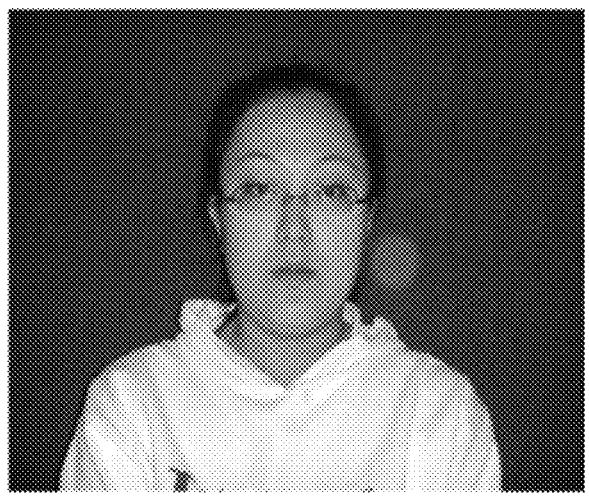
Figure 2C:
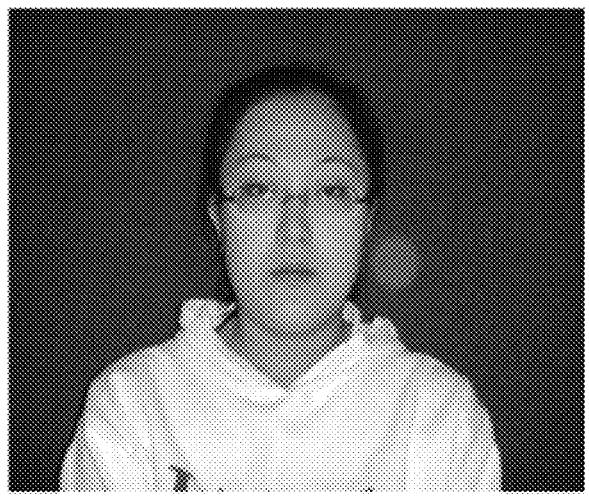

FIGS. 2A-2C illustrates an example of working with detected features. In FIG. 2A, input and predetermined data are illustrated with colors including cyan (blueish hue) for the face rectangle, green for face features such as eye and mouth or lips, and red for skin inside the face area.

FIG. 2B illustrates an initial image, and FIG. 2C illustrates an output result using auto face beautification.

Enhancement of Facial Features (Eyes and Mouth)

Besides removing skin artifacts (wrinkles, pimples etc.), eyes and mouth beautification may be applied as well towards an overall better visual aspect of the face. The following actions may be taken for eye and mouth beautification.

Initial locations of eyes and mouth may be (coarsely) determined as the largest holes in the PCA skin map located in the upper left, upper right and lower half parts of the face rectangle or other shape.

More precise eye and mouth localization may be performed at a higher resolution (XGA at least) in a small neighborhood surrounding the initial areas described above, as follows:

A mouth area may be detected based on color information. When using YUV color space, it may be defined as the area which has the V component higher than a threshold (computed based on the local V histogram).

The presence of teeth may be checked by inspecting the histogram of saturation S inside the smallest rectangle surrounding the mouth area. If working in YUV color space, saturation may be computed as S=abs(U)+abs(V). If the histogram of saturation is unimodal, then teeth might not be visible. If the histogram of saturations is bimodal, then the area corresponding to the inferior mode of the histogram may be inspected. If this area is found to be located inside the mouth area (more precisely, if a sandwich mouth-teeth-mouth is present), then it may be decided that teeth are visible.

One or both eye areas may be detected each as a connected area that has the normalized Y·S component lower than a threshold (computed based on the local Y·S histogram). In the above expression, Y is the normalized intensity component from the YUV color space, whereas S is the normalized saturation, computed as above. Normalization of both Y and S may be done with respect to the local maximum values.

The iris may be detected as the central, darker part of the eye, whereas sclera (eye white) may be detected as the remaining part of the eye.

Mouth and eye beautification may include any one or more or all of the following steps, not necessarily in the order described:

The mouth redness may be increased. In YUV color space this may be done by multiplying the V value inside the mouth area by a predefined factor (e.g., 1.2).

The teeth may be whitened by slightly increasing the Y component while reducing the absolute value of U and V components.

The eye white may be brightened and whitened, by slightly increasing the Y component while reducing the absolute value of U and V components inside the eye white area.

The iris may be improved by stretching the intensity contrast inside the iris area. Also, if the red eye phenomenon is present (which results in an increased V value of the pupil area located inside the iris), a red eye correction algorithm may be applied, as may a golden eye algorithm (see, e.g., U.S. Pat. Nos. 6,407,777, 7,042,505, 7,474,341, 7,436,998, 7,352, 394, 7,336,821 and 7,536,036, which are incorporated by reference).

In accordance with several embodiments, the quality of portrait images may be improved by doing face, skin and/or face feature enhancement.

Alternative Embodiments

Certain embodiments benefit very advantageously when provided on digital camera and especially on a handheld camera-equipped device. Using specific data from a face detector, or even a face tracker (with data from multiple image frames) can permit the method to perform advantageously. In one embodiment, an enhanced face image may be aquired dynamically from a face tracker module. The use of a PCA to determine main skin color can be advantageous, as well as using the two other color space dimensions to determine variation from that color. The method may include decorrelating the color space into "primary skin" and "secondary skin". The use of the "secondary skin" dimensions to determine "good skin" can be advantageous for skin detection as well. A smaller image may be used for the detection, while the localized smoothing kernel(s) may be applied to the full image, thereby saving valuable processing resources to great advantage on a handheld device. Two skin maps may be used, including an "exclusive" one combined with an "inclusive" one, and face detection data may also be utilized. Many "skin analysis" and tone/color/contrast and other image adjustment techniques may be combined with embodiments described herein, e.g. as described at US published application no. 2006/0204110, which is incorporated by reference. Skin and facial feature detection (eyes, mouth) is advantageously used in facial image enhancement, which may include smoothing, blur, texture modification, noise reduction/enhancement, or other technique for reducing a visual effect of a blemish or blemished region of a face. Wrinkle correction may be effected within certain embodiments.

In addition, PCA-based "strong" skin detection may be advantageously utilized, which enables detection of only those skin tones which are similar to those of the face, and may be used to discard other skin-like patches whose color is yet different from that of the skin (e.g., a wall behind, light hair, etc.).

The embodiments described herein utilize application of selective smoothing which is not to all skin pixels of the face, but only to those which are likely to be or include artifacts (e.g., wrinkles, pimples, freckles etc.). This is very different from global solutions where all facial skin pixels or the entire face are smoothed and facial non-skin pixels (e.g. mouth, eyes, eyebrows) are sharpened. These embodiments serve to preserve intrinsic skin textures, while removing unwanted artifacts. For instance, a person's will look their age, thus remaining natural, while still improving the appearance of the face.

Age Classification

In another embodiment, a processor-based digital image acquisition device is provided, e.g., with a lens and image sensor, a processor and code for programming the processor to perform a method of enhancing acquisition parameters of a digital image as part of an image capture process using face detection within said captured image to achieve one or more desired image acquisition parameters. Multiple groups of pixels that correspond to a face within a digitally-acquired reference image are identified. Values are determined of one or more attributes of the face. One or more default image attribute values are compared with one or more of the determined values. The face is classified according to its age based on the comparing of the image attribute values. A camera acquisition parameter is adjusted based on the classifying of the face according to its age.

A main image is captured in accordance with the adjusting of the camera acquisition parameter.

The process may also include generating in-camera, capturing or otherwise obtaining in-camera a collection of low resolution images including the face, and tracking said face within said collection of low resolution images. The identifying of face pixels may be automatically performed by an image processing apparatus. Automated processing of the face pixels may be performed based on the classifying.

The camera acquisition parameter may include exposure. The age of the face may be classified as that of a child, baby, youth, adult, elderly person, and/or may be determined based on recognition of a particular face. The adjusting of the camera acquisition parameter may include reducing exposure. Fill-flash may be applied to the face in post-processing. The adjusting of camera acquisition parameter may include optimizing focus on a baby's or child's or youth's face, centering the face, increasing the size of the face, cropping around the face, adjusting the orientation or color of the face, or combinations thereof, and/or may involve increasing the resolution and/or reducing the compression of pixels of the face of the baby or child or other classification of face.

The face may be tracked over a sequence of images.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference: U.S. Pat. Nos. 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 5,781,650, 7,362,368 and 5,978,519; and U.S. published application nos. 2005/0041121, 2007/0110305, 2006/0204110, PCT/US2006/021393, 2005/0068452, 2006/0120599, 2006/0098890, 2006/0140455, 2006/0285754, 2008/0031498, 2007/0147820, 2007/0189748, 2008/0037840, 2007/0269108, 2007/0201724, 2002/0081003, 2003/0198384, 2006/0276698, 2004/0080631, 2008/0106615, 2006/0077261 and 2007/0071347; and U.S. patent applications Nos. 10/764,339, 11/573,713, 11/462,035, 12/042,335, 12/063,089, 11/761,647, 11/753,098, 12/038,777, 12/043,025, 11/752,925, 11/767,412, 11/624,683, 60/829,127, 12/042,104, 11/856,721, 11/936,085, 12/142,773, 60/914,962, 12/038,147, 11/861,257, 12/026,484, 11/861,854, 61/024,551, 61/019,370, 61/023,946, 61/024,508, 61/023,774, 61/023,855, 61/221,467, 61/221,425, 61/221,417, 61/182,625, 61/221,455, 11/319, 766, 11/673,560, 12/485,316, 12/479,658, 12/479,593, 12/362,399, and 12/302,493.

What is claimed is:

1. A method of enhancing an appearance of a face within a digital image, comprising using a processor in:

acquiring a digital image of a scene including a face, including capturing the image using a lens and an image sensor, or receiving said image following capture by a device that includes a lens and an image sensor, or a combination thereof;

identifying the face within the digital image;

segmenting skin tone portions of the face from face features including one or two eyes or a mouth or combinations thereof;

within the skin tone portions of the face, identifying one or more blemish regions that vary in luminance at least a threshold amount from non-blemished skin tone portions;

smoothing luminance data of the one or more blemish regions to generate smoothed luminance data;

generating an enhanced image including an enhanced version of the face that has original luminance data of the one or more blemish regions replaced with the smoothed luminance data and combined with original non-blemished skin tone portions; and displaying, transmitting, communicating or digitally storing or otherwise outputting the enhanced image or a further processed version, or combinations thereof; and determining certain non-skin tone pixels within one or more sub-regions that do not comprise a threshold skin tone, and removing, replacing, reducing an intensity of, or modifying a color of said certain non-skin tone pixels, or combinations thereof.

2. The method of claim 1, wherein the localized luminance smoothing comprises blurring or averaging luminance data, or a combination thereof.

3. The method of claim 1, further comprising applying one or more localized color smoothing kernels to the one or more sub-regions, and wherein the one or more enhanced sub-regions of the corrected image further comprise pixels modified from original pixels of the face at least by localized color smoothing.

4. The method of claim 1, further comprising applying noise reduction or enhancement, or both, to the one or more sub-regions, and wherein the one or more enhanced sub-regions of the corrected image further comprise pixels modified from original pixels of the face at least by localized noise reduction or enhancement, or both.

5. The method of claim 1, wherein enhanced pixels of the one or more enhanced sub-regions comprise enhanced intensities which comprise one or more functions of a relationship between original pixel intensities and local average intensities within the one or more original or enhanced sub-regions, or combinations thereof.

6. The method of claim 1, further comprising detecting one or more: mouth or eye regions, or combinations thereof, within the face, and identifying and enhancing a natural color of one or more sub-regions within the one or more mouth or eye regions, including one or more teeth, lips, tongues, eye whites, eye brows, iris's, eye lashes, or pupils, or combinations thereof.

7. The method of claim 1, further comprising classifying the face according to its age based on comparing one or more default image attribute values with one or more determined values; and adjusting one or more camera acquisition or post-processing parameters, or combinations thereof, based on the classifying of the face according to its age.

8. A digital image acquisition device, comprising
a lens,
an image sensor and
a processor, and
a processor-readable memory having embodied therein processor-readable code for programming the processor to perform a method of enhancing an appearance of a face within a digital image, wherein the method comprises:

acquiring a digital image of a scene including a face, including capturing the image using a lens and an image sensor, or receiving said image following capture by a device that includes a lens and an image sensor, or a combination thereof;

identifying the face within the digital image;

segmenting skin tone portions of the face from face features including one or two eyes or a mouth or combinations thereof;

within the skin tone portions of the face, identifying one or more blemish regions that vary in luminance at least a threshold amount from non-blemished skin tone portions;

smoothing luminance data of the one or more blemish regions to generate smoothed luminance data;

generating an enhanced image including an enhanced version of the face that has original luminance data of the one or more blemish regions replaced with the smoothed luminance data and combined with original non-blemished skin tone portions; and displaying, transmitting, communicating or digitally storing or otherwise outputting the enhanced image or a further processed version, or combinations thereof, and wherein the method further comprises determining certain non-skin tone pixels within the one or more sub-regions that do not comprise a threshold skin tone, and removing, replacing, reducing an intensity of, or modifying a color of said certain non-skin tone pixels, or combinations thereof.

9. The device of claim 8, wherein the localized luminance smoothing comprises blurring or averaging luminance data, or a combination thereof.

10. The device of claim 8, wherein the method further comprises applying one or more localized color smoothing kernels to the one or more sub-regions, and wherein the one or more enhanced sub-regions of the corrected image further comprise pixels modified from original pixels of the face at least by localized color smoothing.

11. The device of claim 8, wherein the method further comprises applying noise reduction or enhancement, or both, to the one or more sub-regions, and wherein the one or more enhanced sub-regions of the corrected image further comprise pixels modified from original pixels of the face at least by localized noise reduction or enhancement, or both.

12. The device of claim 8, wherein enhanced pixels of the one or more enhanced sub-regions comprise enhanced intensities which comprise one or more functions of a relationship between original pixel intensities and local average intensities within the one or more original or enhanced sub-regions, or combinations thereof.

13. The device of claim 8, wherein the method further comprises detecting one or more mouth or eye regions, or combinations thereof, within the face, and identifying and enhancing a natural color of one or more sub-regions within the one or more mouth or eye regions, including one or more teeth, lips, tongues, eye whites, eye brows, iris's, eye lashes, or pupils, or combinations thereof.

14. The device of claim 8, wherein the method further comprises classifying the face according to its age based on comparing one or more default image attribute values with one or more determined values; and adjusting one or more camera acquisition or post-processing parameters, or combinations thereof, based on the classifying of the face according to its age.

15. One or more non-transitory processor-readable media having embodied therein code for programming one or more processors to perform a method of enhancing an appearance of a face within a digital image, wherein the method comprises:

acquiring a digital image of a scene including a face, including capturing the image using a lens and an image sensor, or receiving said image following capture by a device that includes a lens and an image sensor, or a combination thereof;

identifying the face within the digital image;

segmenting skin tone portions of the face from face features including one or two eyes or a mouth or combinations thereof;

within the skin tone portions of the face, identifying one or more blemish regions that vary in luminance at least a threshold amount from non-blemished skin tone portions;

smoothing luminance data of the one or more blemish regions to generate smoothed luminance data;

generating an enhanced image including an enhanced version of the face that has original luminance data of the one or more blemish regions replaced with the smoothed luminance data and combined with original non-blemished skin tone portions; and displaying, transmitting, communicating or digitally storing or otherwise outputting the enhanced image or a further processed version, or combinations thereof, and wherein the method further comprises determining certain non-skin tone pixels within the one or more sub-regions that do not comprise a threshold skin tone, and removing, replacing, reducing an intensity of, or modifying a color of said certain non-skin tone pixels, or combinations thereof.

16. The one or more non-transitory processor-readable media of claim 15, wherein the localized luminance smoothing comprises blurring or averaging-luminance data, or a combination thereof.

17. The one or more non-transitory processor-readable media of claim 15, wherein the method further comprises applying one or more localized color smoothing kernels to the one or more sub-regions, and wherein the one or more enhanced sub-regions of the corrected image further comprise pixels modified from original pixels of the face at least by localized color smoothing.

18. The one or more non-transitory processor-readable media of claim 15, wherein the method further comprises applying noise reduction or enhancement, or both, to the one or more sub-regions, and wherein the one or more enhanced sub-regions of the corrected image further comprise pixels modified from original pixels of the face at least by localized noise reduction or enhancement, or both.

19. The one or more non-transitory processor-readable media of claim 15, wherein enhanced pixels of the one or more enhanced sub-regions comprise enhanced intensities which comprise one or more functions of a relationship between original pixel intensities and local average intensities within the one or more original or enhanced sub-regions, or combinations thereof.

20. The one or more non-transitory processor-readable media of claim 15, wherein the method further comprises detecting one or more mouth or eye regions, or combinations thereof, within the face, and identifying and enhancing a natural color of one or more sub-regions within the one or more mouth or eye regions, including one or more teeth, lips, tongues, eye whites, eye brows, iris's, eye lashes, or pupils, or combinations thereof.

21. The one or more non-transitory processor-readable media of claim 15, wherein the method further comprises classifying the face according to its age based on comparing one or more default image attribute values with one or more determined values; and adjusting one or more camera acquisition or post-processing parameters, or combinations thereof, based on the classifying of the face according to its age.

* * * * *